United States Patent
Hopkins et al.

(10) Patent No.: US 9,021,026 B2
(45) Date of Patent: Apr. 28, 2015

(54) SYSTEM AND METHOD FOR ENHANCED EXPERIENCE WITH A PEER TO PEER NETWORK

(75) Inventors: Samuel P. Hopkins, Freedom, PA (US); Robert J. Boback, Moon Township, PA (US); Christopher L. Gormley, Wexford, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 594 days.

(21) Appl. No.: 11/935,747

(22) Filed: Nov. 6, 2007

(65) Prior Publication Data

US 2008/0140780 A1 Jun. 12, 2008

Related U.S. Application Data

(60) Provisional application No. 60/857,334, filed on Nov. 7, 2006.

(51) Int. Cl.
*G06F 15/16* (2006.01)
*H04L 29/08* (2006.01)
(Continued)

(52) U.S. Cl.
CPC ............ *H04L 67/104* (2013.01); *G06F 21/602* (2013.01); *G06F 21/10* (2013.01);
(Continued)

(58) Field of Classification Search
CPC . G06F 21/10; G06F 21/602; G06F 17/30206; H04L 67/104; H04L 67/1055; H04L 67/1063; H04L 67/1072; H04L 67/2804; H04L 67/2814; H04L 67/2828
USPC ....................... 709/205–206, 232; 726/22, 26
See application file for complete search history.

(56) References Cited

U.S. PATENT DOCUMENTS

| 111,604 A | 2/1871 | Bailey |
| 5,949,760 A | 9/1999 | Stevens et al. |

(Continued)

FOREIGN PATENT DOCUMENTS

| CN | 101606143 | 12/2009 |
| EP | 1107512 A1 | 6/2001 |

(Continued)

OTHER PUBLICATIONS

International Search Report mailed May 14, 2008 in connection with PCT Application No. PCT/US07/23321.
(Continued)

*Primary Examiner* — Linglan Edwards
*Assistant Examiner* — Kevin Bechtel
(74) *Attorney, Agent, or Firm* — Cesari and McKenna, LLP

(57) ABSTRACT

A system and method for implementing a peer to peer (P2P) network that includes a plurality of nodes, wherein each of a majority of the nodes has less than a threshold number of P2P connections to other nodes in the network. A P2P network connection is established between a first node from the majority and an enhanced connection node in the network, wherein the enhanced connection node has more than the threshold number of P2P connections to other nodes in the network. A search request is issued from the first node by transmitting the search request from the first node to the enhanced connection node, and then forwarding the search request from the enhanced connection node to other nodes in the network. Responses to the search request are collected at the enhanced connection node, which filters, ranks or adds additional content to the responses prior to forwarding the responses back to the first node.

11 Claims, 7 Drawing Sheets

(51) Int. Cl.
*G06F 21/60* (2013.01)
*G06F 21/10* (2013.01)
*G06F 17/30* (2006.01)

(52) U.S. Cl.
CPC ....... *G06F17/30206* (2013.01); *H04L 67/2804* (2013.01); *H04L 67/1063* (2013.01); *H04L 67/2814* (2013.01); H04L 67/2828 (2013.01); H04L 67/1055 (2013.01); H04L 67/1072 (2013.01)

(56) References Cited

U.S. PATENT DOCUMENTS

| | | |
|---|---|---|
| 5,987,011 A | 11/1999 | Toh |
| 6,069,896 A | 5/2000 | Borgstahl et al. |
| 6,076,088 A | 6/2000 | Paik et al. |
| 6,205,146 B1 | 3/2001 | Rochberger et al. |
| 6,397,246 B1 | 5/2002 | Wolfe |
| 6,611,196 B2 | 8/2003 | Mynatt et al. |
| 6,668,289 B2 | 12/2003 | Cheng et al. |
| 6,732,180 B1 | 5/2004 | Hale et al. |
| 6,839,769 B2 | 1/2005 | Needham et al. |
| 6,855,660 B2 | 2/2005 | Tsou et al. |
| 6,918,113 B2 | 7/2005 | Patel et al. |
| 6,950,821 B2 | 9/2005 | Faybishenko et al. |
| 6,965,591 B1 | 11/2005 | Roy |
| 6,983,320 B1 | 1/2006 | Thomas et al. |
| 7,003,514 B2 | 2/2006 | Dutta et al. |
| 7,010,534 B2 | 3/2006 | Kraft |
| 7,027,994 B2 | 4/2006 | Verdi et al. |
| 7,035,653 B2 | 4/2006 | Simon et al. |
| 7,089,301 B1 | 8/2006 | Labio et al. |
| 7,120,145 B2 | 10/2006 | Ohba et al. |
| 7,120,619 B2 | 10/2006 | Drucker et al. |
| 7,174,382 B2 | 2/2007 | Ramanathan et al. |
| 7,177,295 B1 | 2/2007 | Sholander et al. |
| 7,206,841 B2 | 4/2007 | Traversat et al. |
| 7,308,445 B2 | 12/2007 | Bharat et al. |
| 7,318,092 B2 | 1/2008 | Sutler |
| 7,327,683 B2 | 2/2008 | Ogier et al. |
| 7,418,455 B2 | 8/2008 | Fan et al. |
| 7,441,180 B1 | 10/2008 | Kaczmarek et al. |
| 7,574,523 B2 | 8/2009 | Traversat et al. |
| 7,587,367 B2 | 9/2009 | Mengerink |
| 7,600,033 B2 | 10/2009 | Bauer et al. |
| 7,703,040 B2 | 4/2010 | Cutrell et al. |
| 2001/0003191 A1 | 6/2001 | Kovacs et al. |
| 2001/0037325 A1 | 11/2001 | Biderman et al. |
| 2001/0045949 A1 | 11/2001 | Chithambaram et al. |
| 2002/0016786 A1* | 2/2002 | Pitkow et al. ............ 707/3 |
| 2002/0044549 A1 | 4/2002 | Johansson et al. |
| 2002/0059204 A1 | 5/2002 | Harris |
| 2002/0065832 A1 | 5/2002 | Mack |
| 2002/0069098 A1 | 6/2002 | Schmidt |
| 2002/0073204 A1 | 6/2002 | Dutta et al. |
| 2002/0087885 A1 | 7/2002 | Peled et al. |
| 2002/0129140 A1* | 9/2002 | Peled et al. .............. 709/224 |
| 2002/0138471 A1 | 9/2002 | Dutta et al. |
| 2002/0143989 A1 | 10/2002 | Huitema et al. |
| 2002/0152262 A1 | 10/2002 | Arkin et al. |
| 2002/0161844 A1 | 10/2002 | Overtoom |
| 2002/0181395 A1 | 12/2002 | Foster et al. |
| 2002/0184310 A1 | 12/2002 | Traversat et al. |
| 2002/0188735 A1 | 12/2002 | Needham et al. |
| 2003/0005035 A1 | 1/2003 | Rodgers |
| 2003/0037167 A1 | 2/2003 | Garcia-Luna-Aceves et al. |
| 2003/0050966 A1 | 3/2003 | Dutta et al. |
| 2003/0050980 A1 | 3/2003 | Dutta et al. |
| 2003/0055892 A1 | 3/2003 | Huitema et al. |
| 2003/0078889 A1 | 4/2003 | Lee et al. |
| 2003/0088544 A1 | 5/2003 | Kan et al. |
| 2003/0095660 A1 | 5/2003 | Lee et al. |
| 2003/0112823 A1 | 6/2003 | Collins et al. |
| 2003/0126136 A1 | 7/2003 | Omoigui |
| 2003/0126199 A1* | 7/2003 | Kadri et al. ............... 709/203 |
| 2003/0135495 A1 | 7/2003 | Vagnozzi |
| 2003/0145093 A1 | 7/2003 | Oren et al. |
| 2003/0182428 A1 | 9/2003 | Li et al. |
| 2003/0191828 A1 | 10/2003 | Ramanathan et al. |
| 2003/0195852 A1 | 10/2003 | Campbell et al. |
| 2003/0202468 A1 | 10/2003 | Cain et al. |
| 2003/0208621 A1 | 11/2003 | Bowman |
| 2003/0212710 A1 | 11/2003 | Guy |
| 2004/0019650 A1 | 1/2004 | Auvenshine |
| 2004/0030651 A1 | 2/2004 | Kim et al. |
| 2004/0034652 A1* | 2/2004 | Hofmann et al. ........... 707/102 |
| 2004/0039921 A1 | 2/2004 | Chuang |
| 2004/0044790 A1 | 3/2004 | Loach et al. |
| 2004/0044996 A1 | 3/2004 | Atallah |
| 2004/0088348 A1 | 5/2004 | Yeager et al. |
| 2004/0098370 A1 | 5/2004 | Garland et al. |
| 2004/0103297 A1 | 5/2004 | Risan et al. |
| 2004/0111604 A1 | 6/2004 | Fournier |
| 2004/0122958 A1 | 6/2004 | Wardrop |
| 2004/0133571 A1* | 7/2004 | Horne et al. ............... 707/3 |
| 2004/0139211 A1 | 7/2004 | Baker et al. |
| 2004/0143842 A1 | 7/2004 | Joshi |
| 2004/0148275 A1 | 7/2004 | Achlioptas |
| 2004/0148434 A1 | 7/2004 | Matsubara et al. |
| 2004/0153472 A1 | 8/2004 | Rieffanaugh |
| 2004/0153658 A1 | 8/2004 | Gunyakti et al. |
| 2004/0157641 A1 | 8/2004 | Chithambaram et al. |
| 2004/0158630 A1 | 8/2004 | Chang et al. |
| 2004/0196784 A1 | 10/2004 | Larsson et al. |
| 2004/0218532 A1 | 11/2004 | Khirman |
| 2004/0220926 A1 | 11/2004 | Lamkin et al. |
| 2004/0230572 A1 | 11/2004 | Omoigui |
| 2004/0236945 A1 | 11/2004 | Risan et al. |
| 2004/0250106 A1 | 12/2004 | Annese et al. |
| 2004/0250122 A1 | 12/2004 | Newton |
| 2004/0260761 A1 | 12/2004 | Leaute et al. |
| 2004/0260801 A1 | 12/2004 | Li |
| 2005/0027821 A1* | 2/2005 | Alexander et al. ........... 709/218 |
| 2005/0028012 A1 | 2/2005 | Amamiya et al. |
| 2005/0038898 A1 | 2/2005 | Mittig et al. |
| 2005/0043548 A1 | 2/2005 | Cates |
| 2005/0060297 A1 | 3/2005 | Najork |
| 2005/0080858 A1 | 4/2005 | Pessach |
| 2005/0091167 A1 | 4/2005 | Moore et al. |
| 2005/0091202 A1 | 4/2005 | Thomas |
| 2005/0091397 A1 | 4/2005 | Roberts et al. |
| 2005/0108203 A1 | 5/2005 | Tang et al. |
| 2005/0108248 A1 | 5/2005 | Natunen |
| 2005/0114709 A1* | 5/2005 | Moore ..................... 713/201 |
| 2005/0119998 A1 | 6/2005 | Greco et al. |
| 2005/0125374 A1* | 6/2005 | Curtis et al. ............... 707/1 |
| 2005/0125673 A1 | 6/2005 | Cheng et al. |
| 2005/0144288 A1 | 6/2005 | Liao |
| 2005/0163050 A1* | 7/2005 | Hopkins .................... 370/231 |
| 2005/0163133 A1 | 7/2005 | Hopkins |
| 2005/0163135 A1 | 7/2005 | Hopkins |
| 2005/0187942 A1 | 8/2005 | Dutta et al. |
| 2005/0203851 A1 | 9/2005 | King et al. |
| 2005/0203892 A1 | 9/2005 | Wesley et al. |
| 2005/0229243 A1 | 10/2005 | Svendsen et al. |
| 2005/0229255 A1 | 10/2005 | Gula et al. |
| 2005/0265259 A1 | 12/2005 | Thubert et al. |
| 2005/0267945 A1 | 12/2005 | Cohen et al. |
| 2006/0020814 A1 | 1/2006 | Lieblich et al. |
| 2006/0029093 A1* | 2/2006 | Van Rossum ............... 370/432 |
| 2006/0034177 A1 | 2/2006 | Schrempp |
| 2006/0039297 A1* | 2/2006 | McNab .................... 370/252 |
| 2006/0117372 A1 | 6/2006 | Hopkins |
| 2006/0136837 A1 | 6/2006 | Ben-Shachar et al. |
| 2006/0206486 A1 | 9/2006 | Strickland |
| 2006/0209819 A1 | 9/2006 | Jennings et al. |
| 2006/0248062 A1 | 11/2006 | Libes et al. |
| 2007/0124721 A1 | 5/2007 | Cowing et al. |
| 2007/0153703 A1 | 7/2007 | Floyd |
| 2007/0162463 A1 | 7/2007 | Kester et al. |
| 2008/0263013 A1 | 10/2008 | Hopkins |

(56) References Cited

U.S. PATENT DOCUMENTS

2009/0024618 A1   1/2009  Fan et al.
2011/0066695 A1   3/2011  Hopkins

FOREIGN PATENT DOCUMENTS

| JP | 2010-509674 | 3/2010 |
|---|---|---|
| WO | WO 03/009524 | 1/2003 |
| WO | WO 2005/074229 A1 | 8/2005 |
| WO | WO 2005/074230 A2 | 8/2005 |
| WO | WO2006/110823 A3 | 10/2006 |
| WO | WO 2006/124027 A1 | 11/2006 |
| WO | WO2008/127608 A3 | 10/2008 |

OTHER PUBLICATIONS

Hessing, Steven, "Peer to Peer Messaging Protocol," Internet-Draft, Apr. 2002, pp. 1-57.

Lindemann, C., et al., "A Distributed Search Service for Peer-to-Peer File Sharing in Mobile Applications," *Peer-to-Peer Computing*, 2002, *Proceedings of the Second International Conference on Peer-to-Peer Computing*, Sep. 5-7, 2002.

Mondal, A., et al., "Effective load-balancing of peer-to-peer systems," Online, Mar. 2002, XP002299388.

Oram, A., "Peer-to-Peer: Harnessing the Power of Disruptive Technologies," Ch.10 Interoperability Through Gateways, Mar. 2001, p. 381-392.

Shi, W., et al., "Tuxedo: A Peer-to-Peer Caching System," Department of Computer Science, Wayne University.

Zhenyun Zhuang, et al. "Hybrid Periodical Flooding in Unstructured Peer-to-Peer Networks," Proceedings of the 2003 International Conference on Parallel Proceeding.

Zhu, et al., "SDQE: Towards Automatic Semantic Query Optimization in P2P Systems," *Information Processing & Management*, 42(1), pp. 222-236 Oct. 26, 2006.

Hwang, J., and Aravamudham, P., "Proxy-Based Middleware Services for Peer-to-Peer Computing in Virtually Clustered Wireless Grid Networks," School of Information Studies, Syracuse University, CST 4-291.

United States House of Representatives Committee on Government Reform—Staff Report Prepard for Rep. Tom Davis and Rep. Henry A. Waxman, "File-Sharing Programs and Peer-to-Peer Networks Provacy and Security Risk," May 13, 2003, pp. 1-12.

United States General Accounting Office, Report to the Chairman and Ranking Minority Member, Committee on Government Reform, House of Representatives, "File Sharing Programs—Peer-To-Peer Networks Provide Ready Accessto Child Pornography," Feb. 2003, pp. 1-32.

Couch, William, "Peer-To-Peer File-Sharing Networks: Security Risk," SANS Institute InfoSec Reading Room, 2002, pp. 1-11.

Davidson, Alan, "Peer-To-Peer File Sharing Privacy and Security," Center for Democracy and Technology, May 15, 2003, pp. 1-16.

AA-2002.02—File Sharing Activity Part 1 of 2—Security Implications of Using Peer-to-Peer File Sharing Software, May 12, 2002, pp. 1-5.

Phemus, "Secret Manual for Downloading: Final Second Part of Answers to Questions for Downloading", PC Japan, vol. 5, 11, pp. 174-179, Nov. 1, 2000.

Office Action, dated Jan. 6, 2011 on U.S. Appl. No. 12/082,407 and subsquent reply.

Office Action, dated Jun. 15, 2011 on U.S. Appl. No. 12/082,407 and subsequent reply.

International Search Report and Written Opinion of the ISA mailed Feb. 26, 2009 in connection with PCT Application No. PCT/US08/004614.

International Search Report and Written Opinion of the ISA mailed Sep. 12, 2007 in connection with PCT Application No. PCT/US06/13666.

International Search Report and Written Opinion of the ISA mailed Jun. 15, 2005 in connection with PCT Application No. PCT/US05/001622.

Andersen, S., et al., Changes to Functionality in Microsoft Windows XP Service Pack 2 Part 2: Network Protection Technologies, Online, Sep. 15, 2004, pp. 1-56, XP002330123.

Brandon Wiley, Freenet, "Inoperability Through Gateways," Chapter 19, pp. 381-392.

Findeli, M., "Peer-to-Peer (P2P) Networkgin," On Line, Jul. 1, 2001, pp. 1-21.

Goel, S., et al., "A Resilient Network That Can Operate Under Duress: To Support Communication Between Government Agencies during Crisis Situations," IEEE, Proceedings of the $37^{th}$ Annual Hawaii International Conference pp. 1-11, Jan. 2004.

Kim, K., and Park , D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?h1=en&1r=& q=cache:Cljbt8-S9ckJ:ideal.cecs.missouri.edu/IMC/papers/377 PD . . .

Liu, Jiangchuan, et al., "Distributed Distance Measurement for Large-Scale Networks," Computer Networks 41 (2003) pp. 177-192.

Marmor, Michael S., "Make the P2P Lead with Toadnode," www.webtecniques.com, Dec. 2000, pp. 44-49.

Markatos, E.P., Tracing a large-scale peer to peer system: an hour in the life of Gnutella, Cluster Computing and the Grid $2^{nd}$ IEEE/ACM International Symposium CCGRID, 2002 Berlin, Germany, May 21-24, 2002, IEEE Comput. Soc., US, pp. 65-74.

Scarlata, V., et al., "Responder Anonymity and Anonymous Peer-to-Peer File Sharing," Proceedings of the International Conference on Network Protocols, Nov. 11, 2001, pp. 272-280.

Siu Man Lui, et al., "Interoperability of Peer-To-Peer File Sharing," ACM SlGecom Exchanges, vol. 3, No. 3, Aug. 2002, pp. 25-33.

*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al v. Cohen & Grigsby, P.C.*, Court of Common Pleas of Allegheny County, Pennsylvania, "First Amended Complaint," 90 pages, dated Nov. 5, 2007.

*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.

*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 29 pages, dated Jan. 30, 2008.

*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Ueda, et al., "Peer-to-Peer Network Topology Control within a Mobile Ad-hoc Network," 2003 IEEE, pp. 243-247.

Xiao, et al., "Mutual Anonymity Protocols for Hybrid Peer-to-Peer Systems," Proceedings of the $23^{rd}$ International Conference on Distributed Computing Systems, May 19-22, 2003.

Zhu, et al., "SDQE: Towards Automatic Semantic Query Optimization in P2P Systems," *Information Processing & Management*, 42(1), pp. 222-236 Oct. 26, 2004.

Zupeng, et al., "Research of Peer-to-Peer Network Architecture," Proceedings of ICCT2003, pp. 312-315.

\* cited by examiner

SYSTEM AND METHOD FOR ENHANCED EXPERIENCE WITH A PEER TO PEER NETWORK

CROSS-REFERENCE TO RELATED APPLICATION

The present application claims priority to U.S. Provisional Application No. 60/857,334 entitled "System and Method for Enhanced Experience with a Peer-to-Peer Network" filed Nov. 7, 2006, incorporated herein by reference.

FIELD OF THE INVENTION

The present invention provides a method for using an Enhancement. System on a peer-to-peer network to enhance the experience of a user.

BACKGROUND OF THE INVENTION

As used herein, peer-to-peer networks which are one of the subjects of the present invention comprise multiple nodes, each node typically consisting both of file server and client that can send and receive data or "Communication messages" to or from a node to which such is connected and other nodes on the network. Common peer-to-peer networks and software applications are Gnutella, FastTrack, Edonkey, NeoNet, Kazaa, Limewire. Morpheus, Bear Share, Bit. Torrent, Shareaza, Emule, and Freenet. This list is not inclusive of all peer-to-peer file applications but rather serves as a general list.

In some peer-to-peer networks, each node is connected to other nodes over a communication medium such as the Internet either directly or through some type of proxy. For example, when a search request is issued such originating node sends a search request to all of the nodes to which it is connected, (see FIG. 1) These nodes search their list of available files and if a match is found they send a response back with the location. However, a peer-to-peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to node A. FIG. 3 discloses a nonproxy loop network wherein each node is directly connected to another.

Some peer-to-peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them. Common names for main nodes are super nodes, ultra peers, or hubs.

Referring to FIG. 5, some peer-to-peer networks can be quite large, often in the hundreds of thousands or millions of nodes. To reduce the bandwidth and other resources required to operate such networks, nodes restrict the "distance" of messages traveling the network. Messages such as searches and responses to searches from nodes contain transmission distance parameters such as hops and time to live to help limit the number of nodes that see and process these messages. One is Hops, which is a value that normally starts at 0 and increments each time the communications is forwarded. Another is Time to Live (TTL) which is a value that normally starts at 5 and is decremented each time the communications is forwarded. When the Bops value reaches a preset limit, often 5, or Time to Live reaches 0, the communications is dropped from the network. Often nodes have a "Max time to live" setting and this value is often set to 5. If a node receives a communication message with a Time to Live which is higher than its configured max Time to Live, the packet is either dropped from the network or the communication message Time to Live is changed to a smaller value from another node. This effectively enforces a community time to live value and limits the amount of nodes that would receive communication message from a transmitting node. Some networks have other mechanisms for limiting the search capabilities of users. Referring to FIG. 5, if the network were configured for 5 hops, Node A would issue a search. Node B would receive it and pass it to Node C. This repeats until Node F receives it. Nodes B-F would process the search and Node F would drop and not forward the search to Node G because it was retransmitted 5 times.

Each node on a peer-to-peer network generally has 2-3 connections to the peer-to-peer network so that they can increase their odds of finding information. Because each connection is to a random node on the peer-to-peer network, each connection generally searches & different group of nodes. Because searches are "repeated" by nodes on the network, sometimes connections have overlapping coverage in that a search sent out via one connection searches nodes available on another connection. This is known as an inefficient connection configuration.

Because the network enforces restrictions when a user searches and because of the nature of the architecture, the user can only search a limited number of nodes on the network. For instance, if the network is composed of twelve million users, a user searching for information may only be able to search 3,000 other users. If the user is searching for a file that is not popular it may not be within the searching radius of the user and the file will not be found, even if it is located on another node elsewhere on the network. It would therefore be advantageous if a user could search more nodes on a network then they normally could with a standard peer-to-peer application or system, thus raising the chance that they would find the information they are looking for.

SUMMARY OF THE INVENTION

Generally, the present invention provides a system for allowing a user to search more nodes on a peer-to-peer network then they normally would have access to. The preferred system comprises the steps of:
  a. User connects to an Enhancement System that has access to more peer-to-peer nodes than the user would; and
  b. Enhancement System accepting messages from the peer-to-peer user; and
  c. Enhancement System acting as a intermediate between the user and the peer-to-peer network in a way as to increase the capabilities or experience of the peer-to-peer user.

Thus, the present invention provides a system and method for enhanced experience with a peer-to-peer network.

More specifically, the present invention is directed to a system and method for implementing a peer to peer (P2P)

network that includes a plurality of nodes, wherein each of a majority of the nodes has less than a threshold number of P2P connections to other nodes in the network. A P2P network connection is established between a first node from the majority and an enhanced connection node in the network, wherein the enhanced connection node has more than the threshold number of P2P connections to other nodes in the network. A search request is issued from the first node by transmitting the search request from the first node to the enhanced connection node, and then forwarding the search request from the enhanced connection node to other nodes in the network. Responses to the search request are collected at the enhanced connection node, and thereafter at least one of the following is performed by the enhanced connection node: (i) filtering the responses, and then forwarding results of the filtering to the first node; (ii) ranking the responses, and then forwarding ranked responses to the first node; and (iii) adding additional content (e.g., an advertisement selected in response to one or more search terms included in the search request) to the responses, and forwarding said additional content and at least some of the responses to the first node.

In some embodiments, the enhanced connection node accesses user profile information associated with the first node, and at least one of the following is performed by the enhanced connection node: (i) filtering the responses in accordance with the profile information, and then forwarding results of the filtering to the first node; (ii) ranking the responses in accordance with the profile information, and then forwarding ranked responses to the first node; and (iii) adding additional content to the responses, wherein, the additional content is selected at least in part using the profile information, and forwarding the additional content and at least some of the responses to the first node.

In some embodiments, the enhanced connection node includes dedicated content that is unavailable on all other nodes in the network, or pointers to dedicated content that is unavailable on all other nodes in the network.

In some embodiments, the first node uses middleware on the first node to establish the P2P network connection between the first node and the enhanced connection node. In such embodiments, the middleware may monitor for transmission of content that should not be shared on the P2P network and perform at least one of the following: (i) block transmission of the content that should not be shared; and (ii) notify another system that there has been transmission of content that should not be shared.

In some embodiments, the enhanced connection node sends a cached list of search responses back to the first node.

Other advantages of the present invention will become apparent from a perusal of the following detailed description of presently preferred embodiments of the invention.

DETAILED DESCRIPTION OF THE INVENTION

Figure 1:
FIG. 1 is a simplified schematic of a two node peer to peer network.
Figure 2:
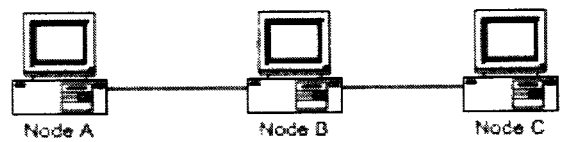
FIG. 2 is a simplified schematic of a peer to peer prosy network.
Figure 3:
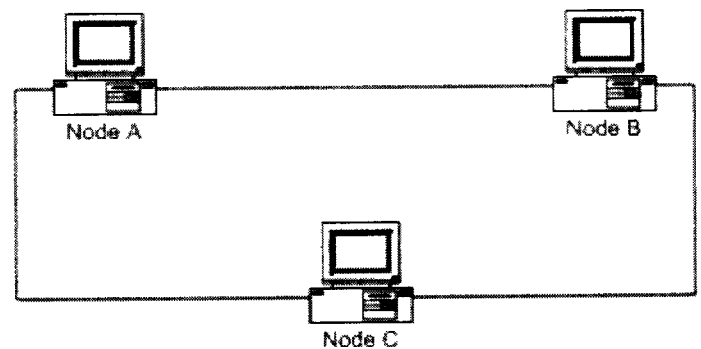
FIG. 3 is a simplified schematic view of a peer to peer, nonproxy, loop network.
Figure 4:
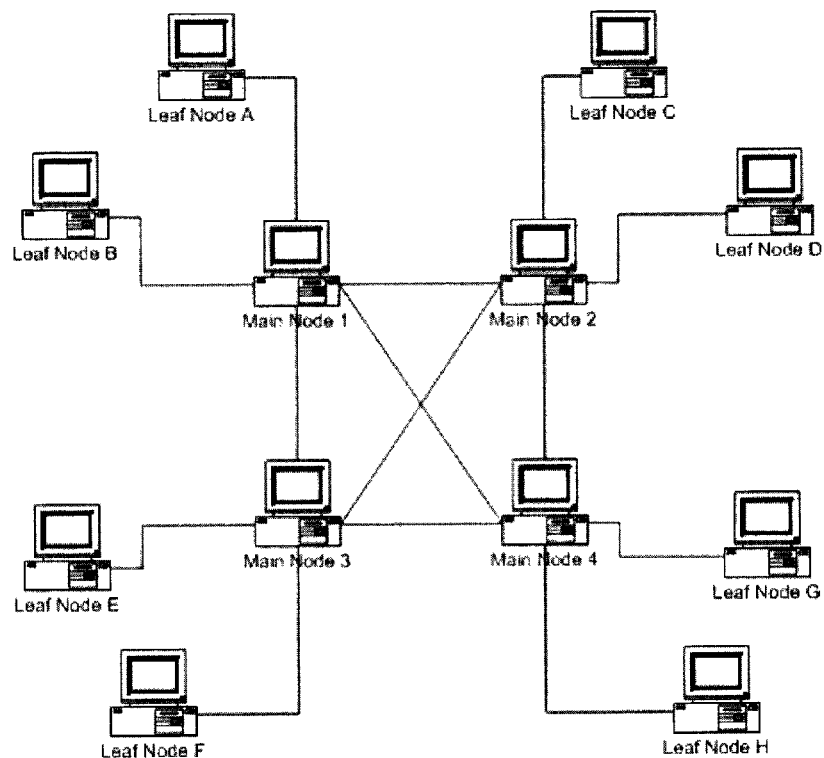
FIG. 4 is a simplified schematic view of a leaf node/main node network.
Figure 5:
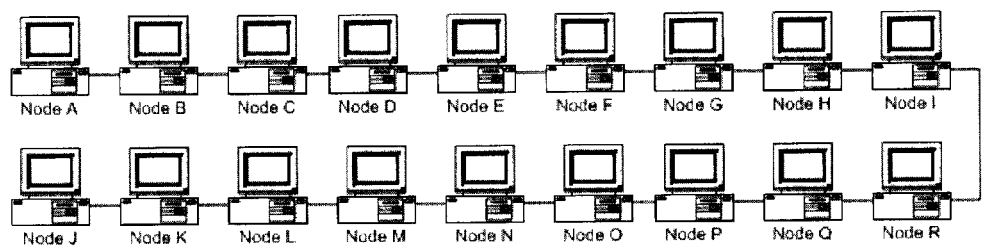
FIG. 5 is a simplified schematic of a peer-to-peer network where nodes are connected to on another in a daisy chain fashion.

The present invention provides a system for allowing a user to search more nodes on a peer-to-peer network than one normally would have access to or by returning information that otherwise would not be available for searching on the peer-to-peer network. It also provides a system and method for filtering any search results that may be returned to the users. It also provides a system and method for adding its own results, such as advertisements, to any search results that may be returned to the user. It also provides a system and method for ranking any results that may be returned to a user, it also provides a system and method for storing attributes of the searcher, the searches that they issue, and the responses mat they receive. It also provides a system and method for storing a WWW browser cookie in the browser of the user based on their searches or any results that may be returned to them. It also provides a system and method to reduce traffic on the peer-to-peer network, and/or increase the speed of search by caching search results. Other advantages of the present invention will become apparent from a perusal of the following detailed description of presently preferred embodiments of the invention.

Generally the invention is comprised of an Enhancement System that is connected to a peer-to-peer network and has more nodes available to search than what a normal peer-to-peer user would have access to and/or it has access to dedicated information that would not be generally available for a peer-to-peer user to search for on the peer-to-peer network. A peer-to-peer user connects to the Enhancement System and sends his peer-to-peer messages (such as searches) to this system. The Enhancement System relays these messages to the peer-to-peer nodes to which it is connected to, which is more than what the peer-to-peer user would normally have been able to access. The Enhancement System receives results back then forwards these results to the peer-to-peer user, thus increasing the amount of results and/or the breadth of their search.

The Enhancement System has access to more nodes or dedicated information on the peer-to-peer network by using different methods. This may include having more connections into the peer-to-peer network than a normal user might or by using highly efficient connections so that each connection or combination of connections accesses more nodes than would a normal connection or combination of normal connections. The Enhancement System could be connected to more hub nodes than the user normally would be or could be. The Enhancement System could contain dedicated information and no connections to the peer-to-peer network. In this case the Enhancement System would have access to dedicated information not available for generalized searching on the peer-to-peer network. The Enhancement System could contain dedicated information and also access to more nodes than what a normal user would commonly have access to.

The Enhancement System may be comprised of multiple systems that share information and workload or ones that operate independently. The Enhancement System may have a system that primarily handles client connections, while other portions of the Enhancement System handle connections to the peer-to-peer network. The Enhancement System could contain filtering systems or systems that contain dedicated content. The Enhancement System may cache search results so that it does not have to issue searches onto the peer-to-peer network that have occurred within a certain time limit.

Generally the system works by connecting into the peer-to-peer network in a way that allows it to have access to more nodes than a normal peer-to-peer user would. A user wishing for enhanced access connects to the Enhancement System using his peer-to-peer application and by utilizing standard peer-to-peer protocols. This allows the user to use any peer-to-peer application that he chooses. The user's peer-to-peer application may also connect to a piece of middleware software that is located on his computer system or another system. This middleware software would then connect to the Enhancement System. The middleware would communicate with the peer-to-peer software application utilizing standard peer-to-peer protocols so that the user can use any peer-to-peer application that he would choose. The middleware application may connect to the Enhancement System and communicate using standard peer-to-peer protocols or it could communicate with a proprietary protocol. The middleware application may be configured to program or change the configuration of the peer-to-peer client application. For instance, the middleware software may configure the peer-to-peer client application so that the peer-to-peer client application connects to the middleware without any user intervention. The peer-to-peer client application could also be programmed with "support" for the middleware application and as such, if it detects that the middleware is installed, it will pass control over to the middleware for communications.

If the Enhancement System Middleware is located on the peer-to-peer user's system and can monitor data traffic it could also be configured to monitor the transmission of files. The Enhancement System Middleware could be configured to monitor for the transmission of files that should not be shared, such as personal information and block this transmission if it detects it. It could also be configured to notify another system if it detects that a file has been sent or received.

The Enhancement system will forward searches it receives from the peer-to-peer network to those peer-to-peer users that are utilizing it. The Enhancement System could be configured to filter and/or remove searches so that the user connected to the Enhancement System would be protected from malicious searches. The Enhancement System could be configured to not forward any searches at all, or to only forward selected searches. The Enhancement System could be configured to always remove certain terms. For instance, if an organization wanted to limit searches for their information the Enhancement System could be configured to not pass these searches in either direction.

Once the peer-to-peer user is utilizing the Enhancement System, either directly or through middleware, any searches or other messages that the user sends will be sent to the Enhancement System. There may be occasions when the peer-to-peer user would also want to search the peer-to-peer network by utilizing the Enhancement System and standard connections to the peer-to-peer network at the same time. In this case the user's peer-to-peer application would be configured to connect to the Enhancement System or Enhancement System Middleware and also to other standard nodes on the peer-to-peer network.

If the Enhancement System detects a search from the peer-to-peer user it will relay the search to the nodes on the peer-to-peer network that it is connected to. The Enhancement System may choose not to forward the search, if for instance if it would result in matches of copyrighted information or some other topic. In this instance, the Enhancement System may choose to respond back to the user with information alerting the user that the search may result in copyrighted or protected information. The Enhancement System could also record the search into a list or database. It could also record the IP address of the peer-to-peer user to a list or database. It could also record to a list or database any attributes it has access to concerning the communication. It could also analyze the search by comparing it to some criteria and setting a "Browser Cookie" in the peer-to-peer user's web browser. The cookie could be used to relay information to a website for target marketing or to enhance the user's experience on a website. It could be used to offer specials or services. It could be used to tailor web usage to the user's searching habits.

If the search that the peer-to-peer user issues would result in an excessive amount of responses (such in the case of a popular artist) the Enhancement System could choose to limit the number of nodes it relays the search to. It could also just drop the search. This would allow for throttling of responses and aim to not overload the Enhancement System or other nodes on the network. The Enhancement System could also choose to limit the number of searches from any one user, or any group of users.

The Enhancement System could change or modify the user's search so that it results in more, less, or more accurate results. It could also create multiple searches, relay these onto the peer-to-peer network and relay the combined list back to the peer-to-peer user as one result set. For instance, a user searches for Madonna and the Enhancement System relays, "Madonna" and "Madonna 2006".

If two or more users are using the Enhancement System and they search for the same term, or the Enhancement System realizes that the terms would result in the same matches, and it's within certain criteria such as time, the Enhancement System could send a cached list of responses back to the second client. This would reduce the amount of searches that are relayed to other nodes of the network.

The Enhancement System could compare the search term to a list of criteria and respond back with a result set that contained a message. The message could be in the form of a file title, a file containing a message, or a pointer to file that contains a message. The message could be a warning that the user is searching for copyrighted information, that copyrighted information may result, or it could be an advertisement. It could also be a file with information different than what the user had asked for. For example a user could issue a search for "Madonna" and the Enhancement System could respond back with an advertisement on how to purchase tickets for her nest concert, or it may respond back with a video of Madonna that she has released for usage on the peer-to-peer network.

Once the Enhancement System issues the search onto the network and receives responses it will relay these responses back to the peer-to-peer user that issued the search. Before sending the results to the peer-to-peer user, the Enhancement System could change the ranking or order of the results, or modify the results to change the ranking or order. The Enhancement System could filter any results, for instance if results contain copyrighted works. It could do this by comparing the file titles, the contents, hashes, file size, or any combination thereof. The Enhancement System could send a message. The message could be in the form of a file title, or a file containing a message. The message may be a warning that the user is searching for copyrighted information or it could be an advertisement. It could also be a file with information different than what the user had asked for. The Enhancement System could send a pointer to a different file. For instance the Enhancement System could send a pointer to a lower quality version of the file or the file with an advertisement inserted into it. The Enhancement System could also record the IP address of the searcher and the results that were relayed and/or received into a list or database. The Enhancement System could be configured to not respond at all.

The Enhancement System could download files from the peer-to-peer network and cache these. If a user issues a search for something the Enhancement System is caching, the Enhancement System would provide pointers to these files.

The Enhancement System could also be utilized to perform filtering of the results so that when a user issues a search, any results would be scrubbed of erroneous files, filenames, or unavailable nodes on the network. This would increase the accuracy of the results that are sent back to the user. The Enhancement System could be configured to drop any results from a node on the network. It might do this because the node was rated low or has a high instance of sending incorrect data.

The Enhancement System could also create its own list of results and send these to the peer-to-peer user either as a replacement of the results or in addition to the results. It could be configured to not relay searches for certain information to the peer-to-peer network but rather create its own list of results. These results could point to files that are on dedicated servers for special purposes. For instance, a peer-to-peer user might search for the popular show "CSI Las Vegas" currently being aired on CBS. CBS could place CSI episodes onto a dedicated peer-to-peer server and when the user searches for "CSI" the Enhancement System would not relay the search to the peer-to-peer network but rather send results back consisting of all of the available CSI shows on the dedicated CBS server.

The Enhancement System might not be used to expand the breadth of the peer-to-peer user's search but rather provide information that would not otherwise be available for the user to search as it is not a part of the peer-to-peer network but merely communicates with the peer-to-peer protocol. For instance, a company could install a peer-to-peer client and add dedicated information but not allow their peer-to-peer client to connect to the peer-to-peer network. The Enhancement System would be configured so that if a user connects to it and searches for the company's information, the Enhancement System would respond back with pointers to files on the dedicated system. The peer-to-peer user could then download the files from the company's dedicated server.

The Enhancement System could utilize a database of IP addresses connected to it to provide information on their availability to other peer-to-peer users. It could also send peer-to-peer users that are connect to it a message and use the response times to determine a ranking. It could then use this information to modify search results back to other peer-to-peer users utilizing the Enhanced System.

The user's peer-to-peer client application could be configured to inform the Enhancement System Middleware program with a list of files that it is sharing. The Enhancement System Middleware could be configured to upload this information the Enhancement System of available files so that the Enhancement System would not have to issue searches onto the peer-to-peer network.

The Enhancement System Middleware could be configured to read the configuration of the user's peer-to-peer client application and build its own list of files available for sharing. The Enhancement System Middleware could be configured to upload this information the Enhancement System of available files so that the Enhancement System would not have to issue searches onto the peer-to-peer network.

An Enhancement System could comprise a hardware system such as a computer, thin appliance, ASIC based device or other similar device, which can be programmed with specific logic or programming code (i.e. software). The device preferably has the capability of being connected with a physical network either directly or though the use of a gateway. The programming logic provides the device with the capability to transmit and receive on both physical networks as well as the peer to peer networks which typically ride on top of a physical network. Programming logic is a software program but may also be hardcoded non-changeable procedural information such as typically found on an ASIC based device.

An Enhancement System Middleware could comprise a hardware system such as a computer, thin appliance, ASIC based device or other similar device, which can be programmed with specific logic or programming code (i.e. software). The device preferably has the capability of being connected with a physical network either directly or though the use of a gateway. The programming logic provides the device with the capability to transmit and receive on both physical networks as well as the peer to peer networks which typically ride on top of a physical network. Programming logic is a software program but may also be hardcoded non-changeable procedural information such as typically found on an ASIC based device.

EXAMPLES

The following Examples illustrate various embodiments of the systems according to the present Invention.

Example 1

Figure 6:
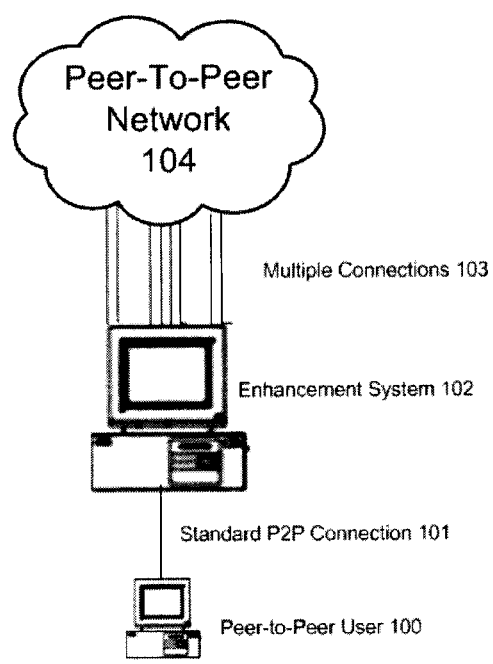
FIG. 6 is a simplified schematic view of a peer-to-peer user connected to the Enhancement System.
Figure 7:
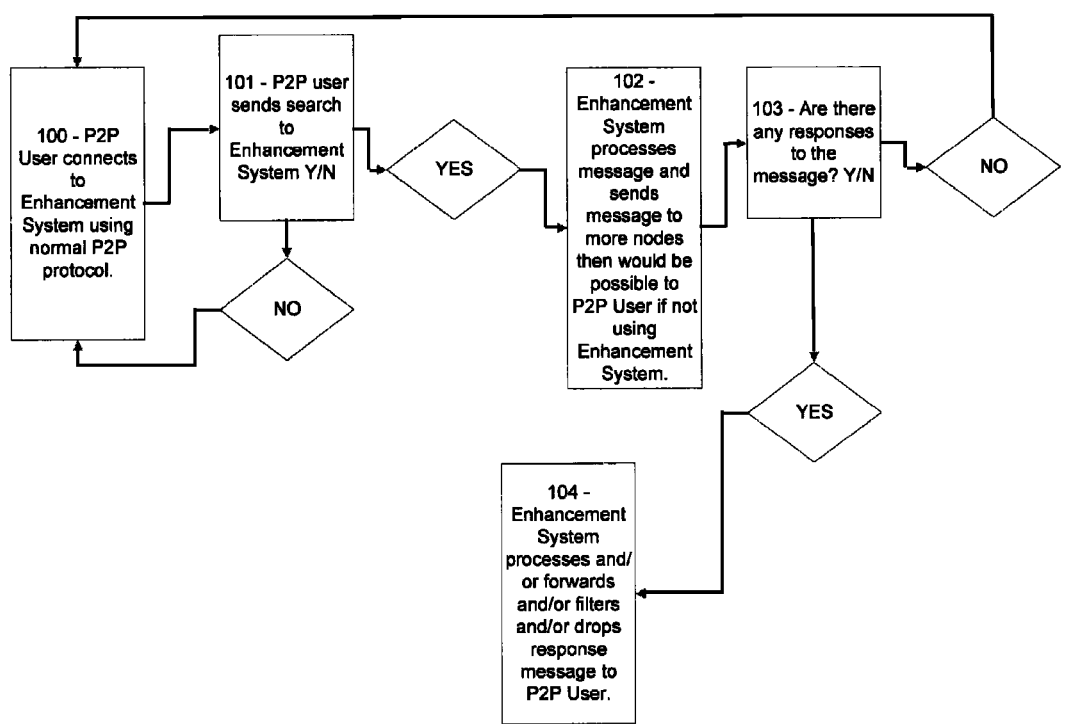
FIG. 7 is a flow chart, of a search utilizing the Enhancement System.

This example describes a standard peer-to-peer user issuing a search to an Enhancement System where the Enhancement System has eight connections to the peer-to-peer network. Referring to FIG. 6 and the flow chart in FIG. 7:

Peer-to-Peer User FIG. 6-100 connects one time to Enhancement System FIG. 6-102 through connection FIG. 6-101 using normal peer-to-peer protocols. Enhancement System FIG. 6-102 connects 8 times into Peer-to-Peer Network 104 through its Multiple Connections FIG. 6-103. Peer-to-Peer User FIG. 6-100 issues a search via Standard P2P Connection FIG. 6-101 to Enhancement System FIG. 6-102. Enhancement System FIG. 6-102 relays the search to the Peer-to-Peer Network FIG. 6-104 via its Multiple Connections FIG. 6-103. Search results are generated by nodes on the Peer-to-Peer Network FIG. 6-104. Results are received at Enhancement System FIG. 6-102 via Multiple Connections FIG. 6-103. Enhancement system FIG. 6-102 relays result set via Standard Connection FIG. 6-101 to Peer-to-Peer User FIG. 6-100. Peer-to-Peer User FIG. 6-100 received results from eight connections (Multiple Connections FIG. 6-103) while it only had one connection (Standard P2P Connection FIG. 6-101), thus improving the search result set.

Example 2

Figure 8:
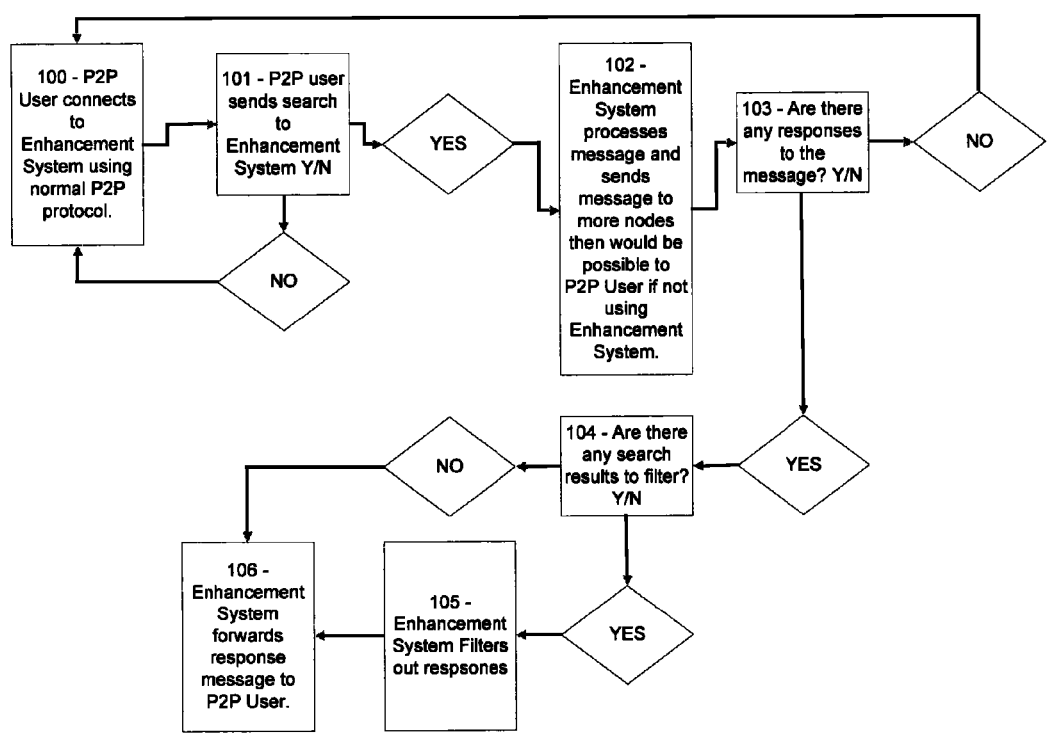
FIG. 8 is a flow chart of a search utilizing the Enhancement System in which the Enhancement System filters results

This example describes a standard peer-to-peer user issuing a search to an Enhancement System with eight connections to the peer-to-peer network and the Enhancement System filtering results. Referring to FIG. 6 and the flow chart in FIG. 8:

Peer-to-Peer User FIG. 6-100 connects one time to Enhancement System FIG. 6-102 through connection FIG.

6-101 using normal peer-to-peer protocols. Enhancement System FIG. 6-102 connects 8 times into Peer-to-Peer Network 104 through its Multiple Connections FIG. 6-103. Peer-to-Peer User FIG. 6-100 issues a search via Standard P2P Connection FIG. 6-101 to Enhancement System FIG. 6-102. Enhancement System FIG. 6-102 relays the search to the Peer-to-Peer Network FIG. 6-104 via its Multiple Connections FIG. 6-103. Search results are generated by nodes on the Peer-to-Peer Network FIG. 6-104. Results are received at Enhancement System FIG. 6-102 via Multiple Connections FIG. 6-103. Enhancement System FIG. 6-102 filters out any results containing "Madonna". Enhancement System FIG. 6-102 relays resulting result set via Standard Connection FIG. 6-101 to Peer-to-Peer User FIG. 6-100. Peer-to-Peer User FIG. 6-100 received results from eight connections (Multiple Connections FIG. 6-103) while it only had one connection (Standard P2P Connection FIG. 6-101), thus improving the search result set.

Example 3

Figure 9:
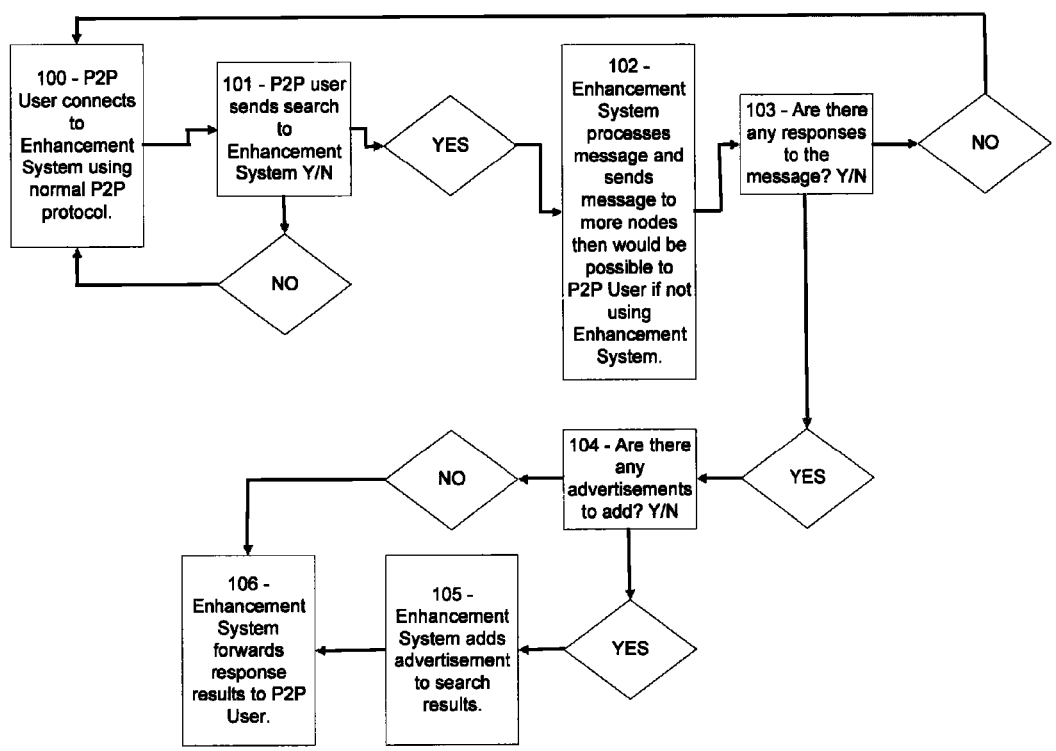
FIG. 9 is a flow chart of a search utilizing the Enhancement System in which the Enhancement System adds an advertisement to any search results.
Figure 10:
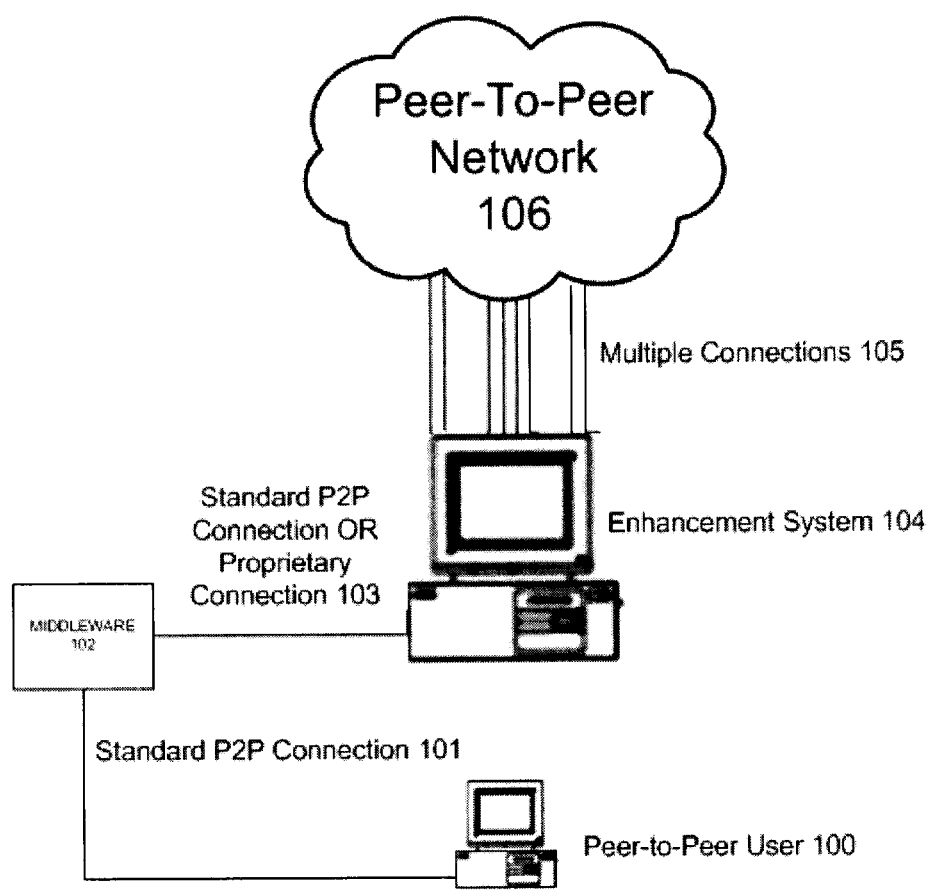
FIG. 10 is a simplified schematic view of a peer-to-peer user connected to the Enhancement System via the Enhancement System Middleware.

This example describes a standard Peer-to-Peer user issuing a search to an Enhancement System with eight connections to the peer-to-peer network and the Enhancement System adding an advertisement for "Madonna". Referring to FIG. 6 and the flow chart in FIG. 9:

Peer-to-Peer User FIG. 6-100 connects one time to Enhancement System FIG. 6-102 through connection FIG. 6-101 using normal peer-to-peer protocols. Enhancement System FIG. 6-102 connects 8 times into Peer-to-Peer Network 104 through its Multiple Connections FIG. 6-103. Peer-to-Peer User FIG. 6-100 issues a search via Standard P2P Connection FIG. 6-101 to Enhancement System FIG. 6-102. Enhancement System FIG. 6-102 relays the search to the Peer-to-Peer Network FIG. 6-104 via its Multiple Connections FIG. 6-103. Search results are generated by nodes on the Peer-to-Peer Network FIG. 6-104. Results are received at Enhancement System FIG. 6-102 via Multiple Connections FIG. 6-103. Enhancement System FIG. 6-102 adds an result to the result set that includes an advertisement for Madonna's newest song, Enhancement System FIG. 6-102 relays new combined result set via Standard Connection FIG. 6-101 to Peer-to-Peer User FIG. 6-100. Peer-to-Peer User FIG. 6-100 received results from eight connections (Multiple Connections FIG. 6-103) while it only had one connection (Standard P2P Connection FIG. 6-101), thus improving the search result set.

Finally, it will be appreciated by those skilled in the art that, changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for implementing a peer to peer (P2P) network that includes a plurality of nodes, wherein each of a majority of the nodes has no more than a threshold number of P2P connections, said method comprising:
   (a) establishing a P2P network connection between a first node from said majority and an enhanced connection node in the network, wherein the enhanced connection node has more than the threshold number of P2P connections to other nodes in the P2P network;
   (b) receiving a search request from the first node at the enhanced connection node, wherein the enhanced connection node is configured to perform filtering options that include:
      (i) dropping the search request;
      (ii) modifying the search request and forwarding the modified search request from the enhanced connection node to the other nodes or a limited number of other nodes in the P2P network; and
      (iii) forwarding the search request from the enhanced connection node to the other nodes or the limited number of other nodes in the P2P network;
   (c) filtering the search request at the enhanced connection node by performing one of the filtering options on the search request;
   (d) collecting, at the enhanced connection node and in response to filtering the search request at the enhanced connection node by performing one of the modifying the search request or forwarding the search request options, responses to the forwarded search request or the modified search request from the other nodes or the limited number of other nodes in the P2P network, and thereafter performing at least the following steps at the enhanced connection node:
      (i) determining whether a P2P user of the first node is searching for files that should not be shared based on the collected responses;
      (ii) filtering said collected responses, the filtering including dropping and blocking collected responses that contain at least one of the following: files that should not be shared and erroneous files or filenames; and
      (iii) adding additional content to said collected responses, wherein the additional content depends upon and relates to the forwarded search request or the modified search request, and forwarding said additional content and at least some of said collected responses to the first node; and
   (e) forwarding, by the enhanced connection node to the first node and in response to filtering the search request at the enhanced connection node by performing the dropping of the search request option, information alerting the P2P user that the search may result in transmission of content that should not be shared.

2. The method of claim 1, wherein the enhanced connection node accesses user profile information associated with the first node, and step (d) further comprises performing at least one of the following steps at the enhanced connection node:
   (i) filtering said collected responses in accordance with the profile information;
   (ii) ranking said collected responses in accordance with the profile information; and
   (iii) adding different additional content to said collected responses wherein the different additional content is selected at least in part using the profile information.

3. The method of claim 1, wherein the first node uses middleware on the first node to establish the P2P network connection between the first node and the enhanced connection node.

4. The method of claim 3, wherein the middleware monitors for transmission of content that should not be shared on the P2P network and performs at least one of the following:
   (i) blocks transmission of the content that should not be shared; and
   (ii) notifies another system that there has been transmission of the content that should not be shared.

5. The method of claim 1, wherein the enhanced connection node sends a cached list of search responses back to the first node.

6. The method as in claim 1, wherein step (d) further comprises:
ranking said collected responses.

7. The method as in claim 1, wherein the additional content is stored on a dedicated server connected to the enhanced connection node.

8. The method of claim 1, wherein the enhanced connection node further records the IP address associated with the first node.

9. The method of claim 1, wherein the additional content is an advertisement selected in response to one or more search terms included in the forwarded search request or the modified search request, and wherein content of the advertisement relates to one or more search terms included in the forwarded search request or the modified search request.

10. A system for implementing a peer to peer (P2P) network that includes a plurality of nodes, wherein each of a majority of the nodes has no more than a threshold number of P2P connections, comprising:
   (a) an enhanced connection node in the network, wherein the enhanced connection node has a P2P network connection to a first node from said majority, and wherein the enhanced connection node has more than the threshold number of P2P connections to other nodes in the network;
   (b) software on the first node that issues a search request from the first node by transmitting the search request from the first node to the enhanced connection node;
   (c) the software on the enhanced connection node that receives the search request from the first node, wherein the enhanced connection node is configured to perform filtering options including:
      (i) drop the search request;
      (ii) modify the search request and forward the modified search request from the enhanced connection node to the other nodes or a limited number of other nodes in the P2P network; and
      (iii) forward the search request from the enhanced connection node to the other nodes or the limited number of other nodes in the P2P network;
   (d) the software on the enhanced connection node that filters the search request at the enhanced connection node by performing one of the filtering options on the search request;
   (e) the software on the enhanced connection node that, in response to filtering the search request at the enhanced connection node by performing one of the forwarding the search request or modifying the search request options, collects, at the enhanced connection node, responses to the forwarded search request or the modified search request, and thereafter performs at least the following at the enhanced connection node:
      (i) determines whether a P2P user of the first node is searching for files that should not be shared;
      (ii) filters said collected responses, the filtering including dropping and blocking collected responses that contain at least one of the following: files that should not be shared and erroneous files or filenames;
      (iii) ranks said collected responses; and
      (iv) adds additional content to said collected responses, wherein the additional content depends upon and relates to the forwarded search request or the modified search request, and forwards said additional content and at least some of said collected responses to the first node; and
   (e) the software on the enhanced connection node that forwards to the first node, in response to filtering the search request at the enhanced connection node by performing the dropping of the search request option, information alerting the P2P user that the search may result in transmission of content that should not be shared.

11. A non-transitory computer-readable storage device with instructions stored thereon that, when executed by one or more computer processors, cause the one or more computer processors to perform operations comprising a method for implementing a peer to peer (P2P) network that includes a plurality of nodes, wherein each of a majority of the nodes has no more than a threshold number of P2P connections, said method comprising:
   (a) establishing a P2P network connection between a first node from said majority and an enhanced connection node in the network, wherein the enhanced connection node has more than the threshold number of P2P connections to other nodes in the P2P network;
   (b) receiving a search request from the first node at the enhanced connection node, wherein the enhanced connection node is configured to perform filtering options that includes:
      (i) dropping the search request;
      (ii) modifying the search request and forwarding the modified search request from the enhanced connection node to the other nodes or a limited number of other nodes in the P2P network; and
      (iii) forwarding the search request from the enhanced connection node to the other nodes or the limited number of other nodes in the P2P network;
   (c) filtering the search request at the enhanced connection node by performing one of the filtering options on the search request;
   (d) collecting, at the enhanced connection node and in response to filtering the search request at the enhanced connection node by performing one of the modifying the search request or forwarding the search request options, responses to the forwarded search request or the modified search request from the other nodes or the limited number of other nodes in the P2P network, and thereafter performing at least the following steps at the enhanced connection node:
      (i) determining whether a P2P user of the first node is searching for files that should not be shared based on the collected responses;
      (ii) filtering said collected responses, the filtering including dropping and blocking collected responses that contain at least one of the following: files that should not be shared and erroneous files or filenames; and
      (iii) adding additional content to said collected responses, wherein the additional content depends upon and relates to the forwarded search request or the modified search request, and forwarding said additional content and at least some of said collected responses to the first node; and
   (e) forwarding, by the enhanced connection node to the first node and in response to filtering the search request at the enhanced connection node by performing the dropping of the search request option, information alerting the P2P user that the search may result in transmission of content that should not be shared.

* * * * *